(12) United States Patent
Jones et al.

(10) Patent No.: US 9,802,504 B2
(45) Date of Patent: Oct. 31, 2017

(54) SYSTEM AND METHOD FOR CHARGING PORTABLE ELECTRONIC DEVICES WITHIN A VEHICLE

(71) Applicant: JAGUAR LAND ROVER LIMITED, Warwickshire (GB)

(72) Inventors: Matt Jones, Coventry (GB); Paul Wheller, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 202 days.

(21) Appl. No.: 14/826,545

(22) Filed: Aug. 14, 2015

(65) Prior Publication Data

US 2017/0043675 A1    Feb. 16, 2017

(51) Int. Cl.
| | |
|---|---|
| *H02J 7/00* | (2006.01) |
| *B60L 11/18* | (2006.01) |
| *H04B 5/00* | (2006.01) |
| *H02J 50/40* | (2016.01) |
| *H02J 50/90* | (2016.01) |
| *G06F 1/26* | (2006.01) |

(52) U.S. Cl.
CPC ....... *B60L 11/1844* (2013.01); *B60L 11/1848* (2013.01); *B60L 11/1861* (2013.01); *H02J 50/40* (2016.02); *H04B 5/0037* (2013.01); *G06F 1/26* (2013.01); *H02J 50/90* (2016.02)

(58) Field of Classification Search
USPC ........................................ 320/106, 108, 162
See application file for complete search history.

(56) References Cited

U.S. PATENT DOCUMENTS

| | | | |
|---|---|---|---|
| 8,823,318 B2* | 9/2014 | Liu | G06Q 30/02 307/104 |
| 2013/0191662 A1 | 7/2013 | Ingrassia, Jr. et al. | |
| 2014/0035523 A1* | 2/2014 | Winget | H04B 1/3816 320/108 |

(Continued)

FOREIGN PATENT DOCUMENTS

| | | |
|---|---|---|
| EP | 2610701 | 7/2013 |
| WO | 2011/028318 A1 | 3/2011 |

OTHER PUBLICATIONS

Partial European Search Report for Application No. EP 16 18 3835 dated Nov. 30, 2016.

(Continued)

*Primary Examiner* — Brian Ngo
(74) *Attorney, Agent, or Firm* — Carlson, Gaskey & Olds (57) ABSTRACT

An illustrative example embodiment of a system includes a plurality of device chargers configured to charge a power source of a portable electronic device. At least one transmitter is associated with a portable electronic device. A plurality of detectors are configured to be supported on a vehicle. The plurality of detectors detect a wireless signal from the transmitter. A controller utilizes information from the detectors regarding a detected wireless signal and determines a location of the transmitter relative to the plurality of device chargers. The controller controls at least a selected one of the device chargers to operate in the charging mode based on a proximity between the determined location of the at least one transmitter and the predetermined location of the selected one of the device chargers.

23 Claims, 4 Drawing Sheets

(56) References Cited

U.S. PATENT DOCUMENTS

| | | | |
|---|---|---|---|
| 2014/0203770 A1* | 7/2014 | Salter .................. | H02J 7/0047 |
| | | | 320/108 |
| 2014/0206384 A1* | 7/2014 | Kim ...................... | H02J 7/025 |
| | | | 455/456.1 |
| 2014/0354063 A1 | 12/2014 | Leabman et al. | |
| 2015/0015194 A1 | 1/2015 | Leabman et al. | |
| 2015/0091506 A1* | 4/2015 | Hyde ................. | B60L 11/1848 |
| | | | 320/108 |
| 2015/0326062 A1* | 11/2015 | Gonzalez Valdez .... | H02J 17/00 |
| | | | 320/108 |

OTHER PUBLICATIONS

The Extended European Search Report for EP Application No. 16183835.4, dated Mar. 7, 2017.

* cited by examiner

SYSTEM AND METHOD FOR CHARGING PORTABLE ELECTRONIC DEVICES WITHIN A VEHICLE

TECHNICAL FIELD

The present disclosure relates to charging portable electronic devices within a vehicle in an efficient manner. Aspects of the invention relate to a system, a vehicle and a method.

BACKGROUND

Modern automotive vehicles include increasing technology for a variety of purposes. In addition, many drivers and passengers bring portable electronic devices, such as mobile phones or tablet computers, into vehicles. There are known technologies for charging such devices using electromagnetic induction rather than requiring a physical power supply cable connection with the device. For example, charging pads upon which a portable electronic device may be placed for purposes of charging the power supply of the device are available.

While it would be useful to provide such charging capabilities within a vehicle, it is not without challenges. One aspect involves incorporating charging devices in a manner that does not disrupt the aesthetics of the vehicle interior. The look and feel of the vehicle interior is important to many vehicle owners, especially in higher end vehicles. It would be useful to essentially hide any charging pads within the vehicle interior to avoid disrupting the interior aesthetics but that presents potential difficulties for an individual to properly situate a device to be charged. Additionally, adding charging devices or pads to a vehicle introduces additional load on the vehicle electrical power system. As vehicles incorporate more and more electronics, power usage management becomes an increasingly important concern.

Embodiments of this invention make it possible to incorporate multiple charging devices into a vehicle interior and to manage power consumption associated with such charging devices.

SUMMARY

Aspects and embodiments of the invention provide a system, a method and a vehicle as claimed in the appended claims.

According to an aspect of the invention there is provided a system for charging a portable electronic device within a vehicle that includes a device charging means, in at least one predetermined location, for charging a power source of a portable electronic device when the device charging means operates in a charging mode. Transmitting means for emitting at least one type of signal is configured to be associated with a portable electronic device. Detecting means for detecting the wireless signal from the transmitting means is configured to be supported on a vehicle. Control means for utilizing information from the detecting means regarding a detected wireless signal from the transmitting means determines a location of the transmitting means relative to the device charging means. The control means controls at least a selected portion of the device charging means to operate in the charging mode based on a proximity between the determined location of the transmitting means and the predetermined location of the selected portion of the device charging means.

In an example embodiment having one or more features of the system of the previous paragraph, the device charging means comprises a plurality of device chargers, the transmitting means comprises at least one transmitter, the detecting means comprises a plurality of detectors, and the control means comprises at least one electronic controller that includes a processing device and associated memory.

According to another aspect of the invention there is provided a system for charging a portable electronic device within a vehicle that includes a plurality of device chargers configured to charge a power source of a portable electronic device in a charging mode. The plurality of device chargers have respective predetermined locations. At least one transmitter is configured to be associated with a portable electronic device and the transmitter emits at least one type of wireless signal. A plurality of detectors are configured to be supported on a vehicle. The plurality of detectors detect the wireless signal from the at least one transmitter. A controller utilizes information from the detectors regarding a detected wireless signal from the at least one transmitter and determines a location of the at least one transmitter relative to the plurality of device chargers. The controller controls at least a selected one of the device chargers to operate in the charging mode based on a proximity between the determined location of the at least one transmitter and the predetermined location of the selected one of the device chargers.

An example embodiment having one or more features of the system of the previous paragraph includes a user interface that provides information regarding a position of the at least one transmitter relative to at least the selected one of the device chargers.

In an example embodiment having one or more features of the system of any of the previous paragraphs, the user interface provides an indication of a movement of a portable electronic device associated with the at least one transmitter that will place the portable electronic device into a position where the selected one of the device chargers can charge the power source of the portable electronic device.

In an example embodiment having one or more features of the system of any of the previous paragraphs, the at least one transmitter comprises a plurality of transmitters associated with one portable electronic device; the controller determines an orientation of the portable electronic device relative to the selected one of the device chargers based on signals from the plurality of transmitters; and the user interface provides an indication of an adjustment of the orientation of the portable electronic device to facilitate charging the power source of the portable electronic device.

In an example embodiment having one or more features of the system of any of the previous paragraphs, the controller is configured to determine a rate of charging provided by the selected one of the device chargers; and determine an adjustment of a position of the portable electronic device associated with the at least one transmitter if the rate of charging is below a predetermined level.

In an example embodiment having one or more features of the system of any of the previous paragraphs, the controller is configured to determine a charge level of the power source of the portable electronic device associated with the at least one transmitter; and selectively control whether the selected one of the device chargers operates in the charging mode based on the determined charge level.

In an example embodiment having one or more features of the system of any of the previous paragraphs, the controller is configured to determine a charge level of at least one portable electronic device; and provide a recommendation to place the portable electronic device close to a selected device charger if the determined charge level is below a threshold.

In an example embodiment having one or more features of the system of any of the previous paragraphs, the controller is configured to communicate with a vehicle navigation system; determine an approximate remaining time of a current trip; determine a rate at which a portable electronic device is being charged; determine whether the rate is sufficient to provide a complete charge to the portable electronic device during the remaining time; and provide an indication to change a position of the portable electronic device relative to the selected device charger if changing the position will increase a likelihood of achieving a complete charge within the remaining time.

In an example embodiment having one or more features of the system of any of the previous paragraphs, the controller is configured to determine that a particular portable electronic device is likely to be used for a task during a trip based on schedule information obtained by the controller; determine a charge level of the particular portable electronic device; and provide an indication to move the particular portable electronic device into a position near the selected charging device if the determined charge level appears inadequate to facilitate performing the task.

In an example embodiment having one or more features of the system of any of the previous paragraphs, the at least one transmitter is configured to be secured to an exterior of the portable electronic device, configured to be secured to a case that is configured to receive the portable electronic device, or included within the portable electronic device.

In an example embodiment having one or more features of the system of any of the previous paragraphs, each device charger has a power-saving, inactive mode during which the device charger does not operate to provide charge to a portable electronic device; and each device charger remains in the power-saving, inactive mode unless the controller causes the device charger to operate in the charging mode.

According to another aspect of the invention there is provided a vehicle including a system having one or more features of the system of any of the previous paragraphs, wherein the detectors are supported on the vehicle to detect the wireless signal at least when the at least one transmitter is within an interior of the vehicle, and the device chargers are situated in predetermined locations in the vehicle interior.

According to another aspect of the invention there is provided a method of charging a portable electronic device that includes detecting a wireless signal from at least one transmitter using a plurality of detectors that are configured to be supported on a vehicle, the at least one transmitter being configured to be associated with a portable electronic device; determining a location of the at least one transmitter relative to a plurality of device chargers based on the detected wireless signal, the plurality of device chargers being configured to charge a power source of a portable electronic device in a charging mode, the plurality of device chargers having respective predetermined locations; and controlling at least a selected one of the device chargers to operate in the charging mode based on a proximity between the determined location of the at least one transmitter and the predetermined location of the selected one of the device chargers.

An example embodiment including one or more features of the method of the previous paragraph includes providing information through a user interface regarding a position of the at least one transmitter relative to at least the selected one of the device chargers.

An example embodiment including one or more features of the method of any of the previous paragraphs includes using the user interface to provide an indication of a movement of a portable electronic device associated with the at least one transmitter that will place the portable electronic device into a position where the selected one of the device chargers can charge the power source of the portable electronic device.

In an example embodiment including one or more features of the method of any of the previous paragraphs, the at least one transmitter comprises a plurality of transmitters associated with one portable electronic device, and the method includes determining an orientation of the portable electronic device relative to the selected one of the device chargers based on signals from the plurality of transmitters, and using the user interface to provide an indication of an adjustment of the orientation of the portable electronic device to facilitate charging the power source of the portable electronic device.

An example embodiment including one or more features of the method of any of the previous paragraphs includes determining a rate of charging provided by the selected one of the device chargers; and determining an adjustment of a position of the portable electronic device associated with the at least one transmitter if the rate of charging is below a predetermined level.

An example embodiment including one or more features of the method of any of the previous paragraphs includes determining a charge level of the power source of the portable electronic device associated with the at least one transmitter; and selectively controlling whether the selected one of the device chargers operates in the charging mode based on the determined charge level.

An example embodiment including one or more features of the method of any of the previous paragraphs includes determining a charge level of at least one portable electronic device; and providing a recommendation to place the portable electronic device close to a selected device charger if the determined charge level is below a threshold.

An example embodiment including one or more features of the method of any of the previous paragraphs includes determining an approximate remaining time of a current trip based on information from a vehicle navigation system; determining a rate at which a portable electronic device is being charged; determining whether the rate is sufficient to provide a complete charge to the portable electronic device during the remaining time; and providing an indication to change a position of the portable electronic device relative to the selected device charger if changing the position will increase a likelihood of achieving a complete charge within the remaining time.

An example embodiment including one or more features of the method of any of the previous paragraphs includes determining that a particular portable electronic device is likely to be used for a task during a trip based on schedule information obtained by the controller; determining a charge level of the particular portable electronic device; and providing an indication to move the particular portable electronic device into a position near the selected charging device if the determined charge level appears inadequate to facilitate performing the task.

In an example embodiment including one or more features of the method of any of the previous paragraphs, the at least one transmitter is configured to be secured to an exterior of the portable electronic device, configured to be secured to a case that is configured to receive the portable electronic device, or included within the portable electronic device.

An example embodiment including one or more features of the method of any of the previous paragraphs includes maintaining each device charger in a power-saving, inactive mode during which the device charger does not operate to provide charge to a portable electronic device when there is no portable electronic device close enough to the device charger to be charged by the device charger.

According to another aspect of the invention there is provided a vehicle including a system configured to perform the method of any of the previous paragraphs and wherein the detectors are supported on the vehicle to detect the wireless signal at least when the at least one transmitter is within an interior of the vehicle, and the device chargers are situated in predetermined locations in the vehicle interior.

Within the scope of this document it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Embodiments of this invention facilitate an individual in a vehicle wirelessly charging a portable electronic device in a variety of locations within the vehicle. A disclosed example embodiment provides information to an individual to guide them in placing a device in a position where effective charging is possible. A disclosed example embodiment includes control over charging devices to manage power consumption.

Figure 1:
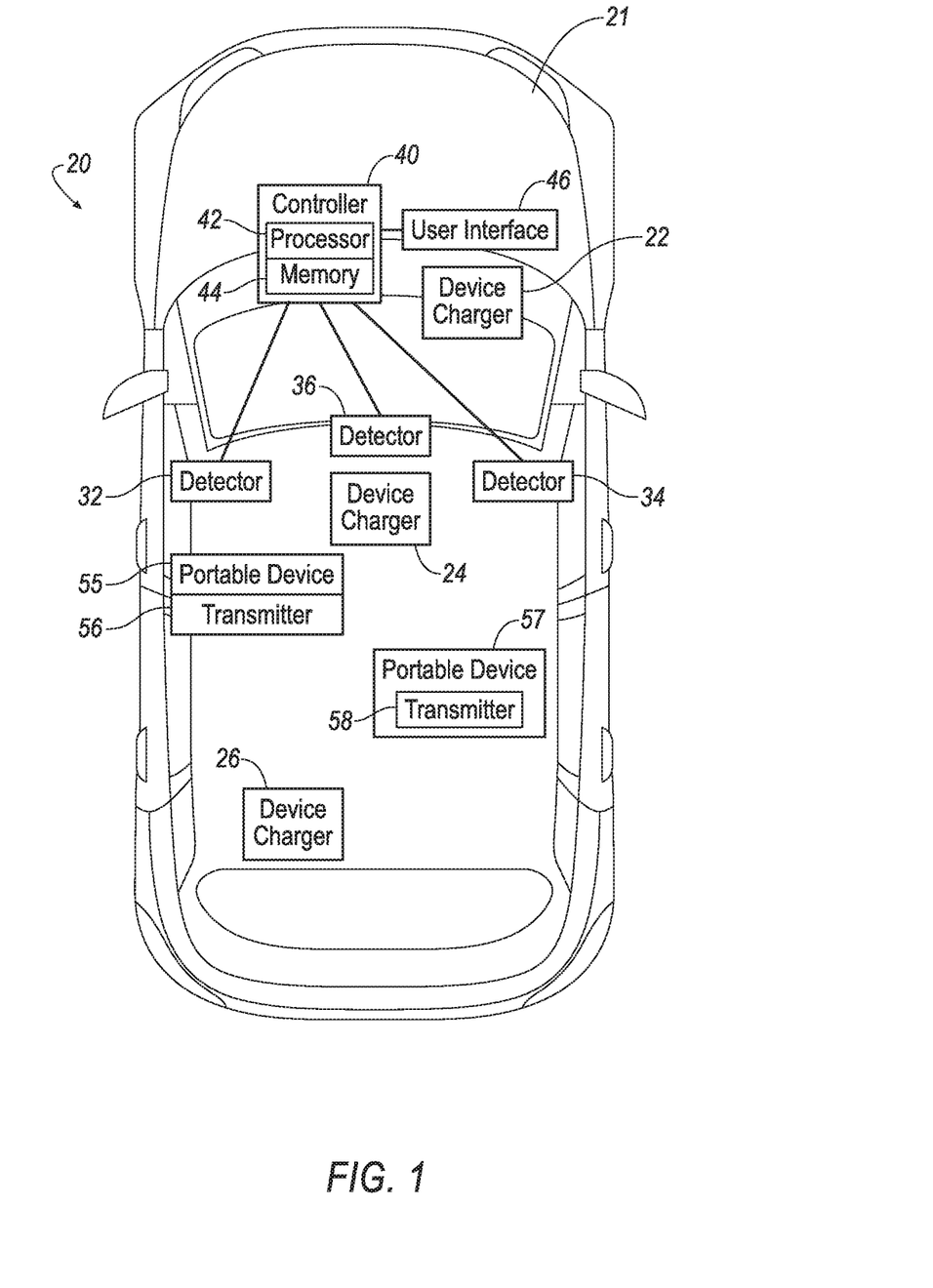
FIG. 1 diagrammatically illustrates an example embodiment of a system designed according to an embodiment of this invention associated with a vehicle.

FIG. 1 schematically illustrates an example system 20 for charging portable electronic devices within a vehicle 21. The system 20 includes charging means for charging a power source of a portable electronic device. The illustrated example charging means comprises a plurality of device chargers 22, 24 and 26. The device chargers 22-26 are configured to be situated within a vehicle in a variety of locations. In one example, the device charges 22-26 utilize known inductive technology for wirelessly charging a portable electronic device that is placed in close proximity to the device charger. One example embodiment includes charging pads against which a portable electronic device may be placed for purposes of charging the power source of that device. Those skilled in the art who have the benefit of this description will be able to select from among commercially available charging pads or to customize such pads to meet their particular needs.

The system 20 includes detecting means for detecting the presence of a portable electronic device. In the illustrated example, the detecting means comprises a plurality of detectors 32, 34 and 36 that are configured to be situated in various locations on a vehicle. The detectors 32, 34 and 36 comprise devices compatible with known short range wireless communication technologies or protocols that are configured to detect a wireless signal provided by at least one transmitter. In example embodiments, the detectors 32, 34 and 36 comprise transceivers or receivers that are compatible with at least one of ultra-wideband, Bluetooth, infrared or Zigbee communications.

A control means 40 for controlling operation of the charging means utilizes information from the detectors 32-36 to determine a location of a portable electronic device relative to at least one of the device chargers. The control means in this example embodiment includes a controller 40 having a processor 42 and associated memory 44. The example controller 40 may comprise a control unit or computational device having one or more electronic processors, such as a microprocessor, a microcontroller, an application specific integrated circuit (ASIC), or a combination of such processors. The system 20 may comprise a single electronic controller or alternatively, different functions of the example controller 40 may be embodied in or hosted in different control devices. The term "controller" as used in this description should be understood to include a single controller or a plurality of controllers collectively operating to provide the required control functionality.

A set of instructions to be executed by the processor 42 may be stored on the memory 44. Such instructions, when executed, result in the controller 40 implementing the control techniques explained in this description including some or all of the functionality or methodology that is described. The set of instructions could be embedded in one or more electronic processors. Alternatively, the set of instructions could be provided as software to be executed by the processor 42. The controller 40 may be implemented in software run on one or more processors. One or more other controllers may be implemented in software run on one or more processors. Other arrangements of electronics for realizing a controller that performs the functions of the controller 40 mentioned in this description may become apparent to those skilled in the art who have the benefit of this description.

In some example embodiments, the memory 44 contains stored instructions for software, firmware, programs, algorithms, scripts, applications, information, etc., that may govern all or part of the techniques explained in this description, which may govern all or part of the operation of the processor 42 and controller 40. The memory 44 in the illustrated example embodiment comprises a non-transitory computer readable storage medium, such as a magnetic storage medium, optical storage medium, magneto-optical storage medium, read only memory, random access memory, erasable programmable memory, flash memory, or electrical or other type of medium for storing computer-executable information and instructions. While the memory portion 44 is schematically shown as part of the controller 40, it may comprise a separate device that is electronically connected to other components of the system 20 using suitable communications, such as a CAN bus or SMBus to facilitate interaction between such devices.

The example system 20 of FIG. 1 also includes information means for providing information to an individual regarding placement of a portable electronic device for purposes of charging that device. In the illustrated example, the information means includes a user interface 46 that is configured to provide at least one of a visual or audible indication to an individual to facilitate that individual achieving a desired charging of a portable electronic device.

Figure 2:
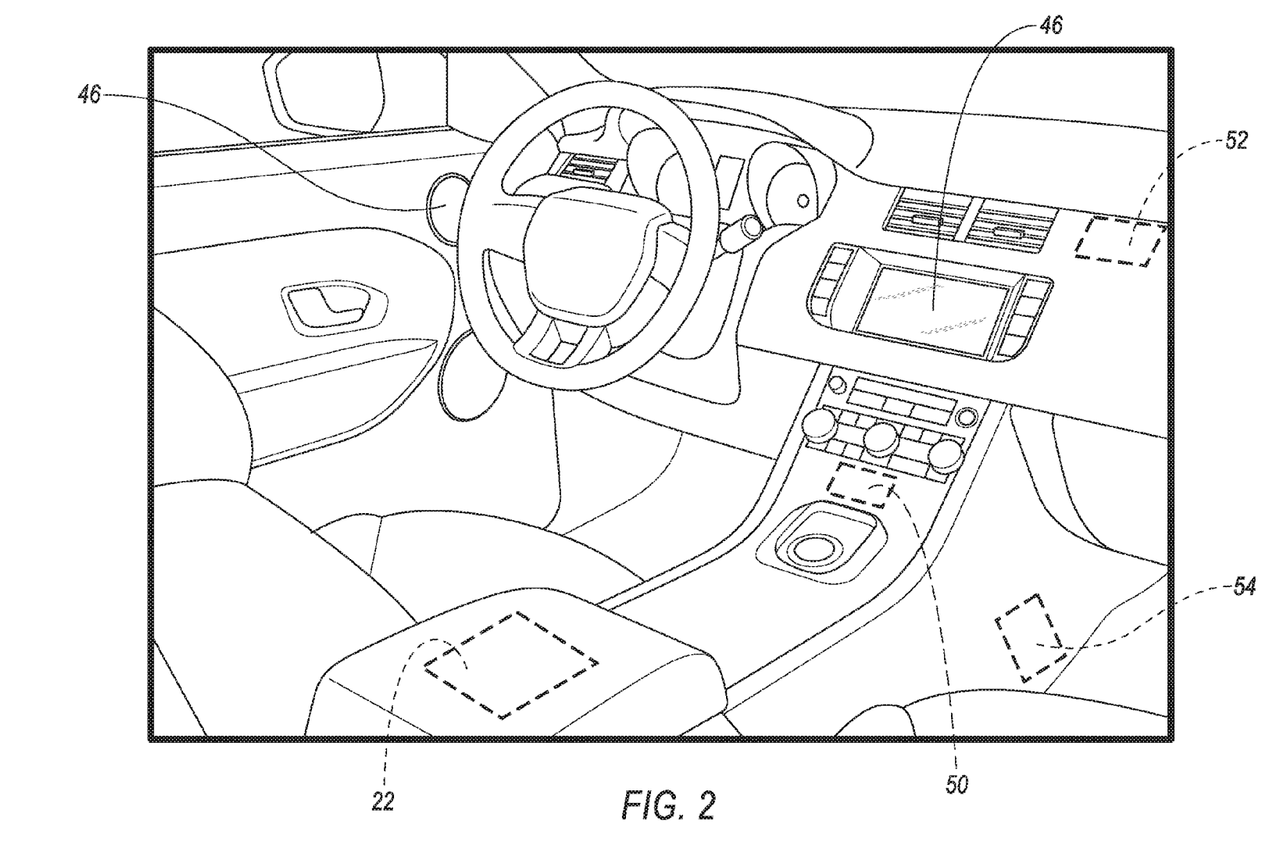
FIG. 2 schematically illustrates selected portions of a vehicle interior incorporating features of a system designed according to an embodiment of this invention.
Figure 3:
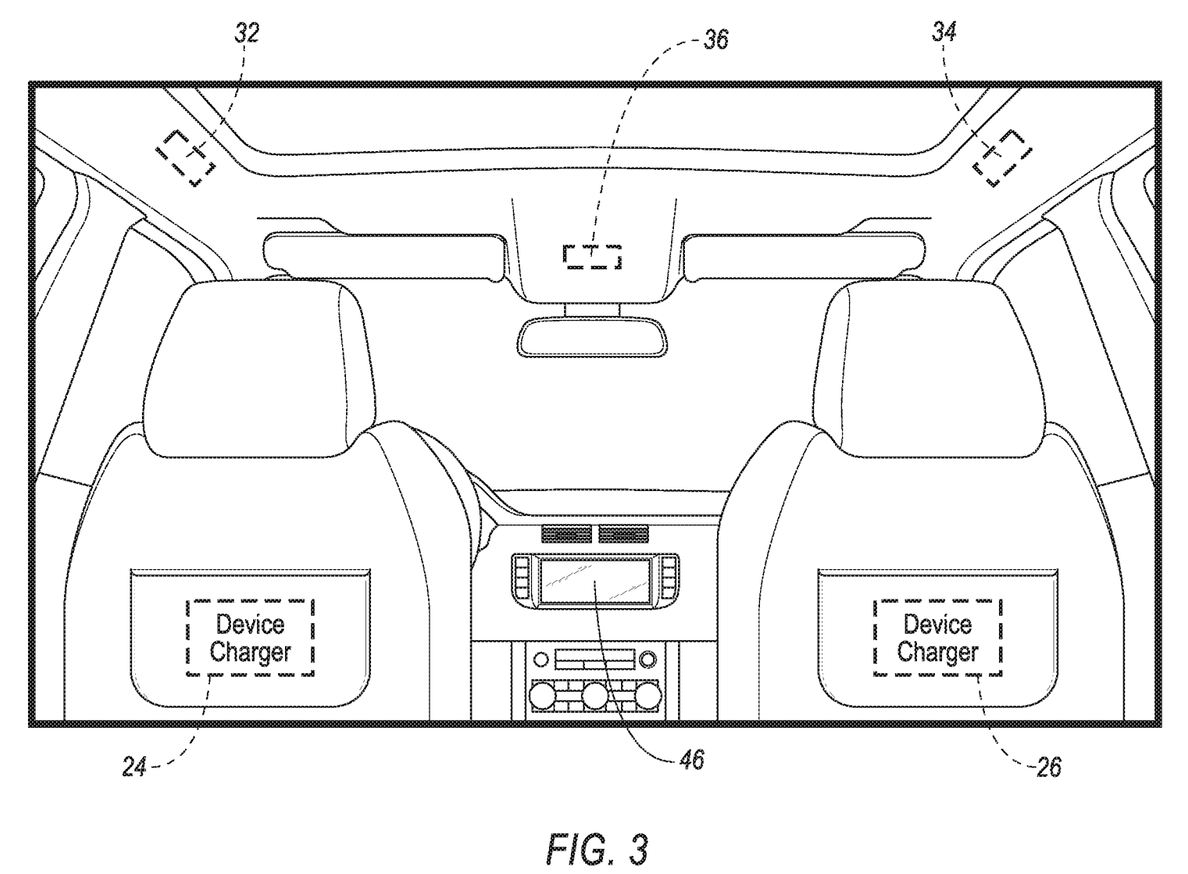
FIG. 3 is another view of a vehicle interior that schematically illustrates selected components of an example embodiment.

FIGS. 2 and 3 schematically illustrate some of the features of the system 20 within an example vehicle interior. The user interface 46 in this example includes a display screen and audio output means such as speakers. The detectors 32, 34 and 36 are situated as part of the vehicle roof or headliner in positions where the detectors are able to detect wireless signals emanating from a device that is situated within the vehicle interior. The device chargers in this example are situated in various locations within the vehicle interior. The device charger 22 is situated on an armrest of a center console. The device chargers 24 and 26 are situated on seat backs where a portable device can be placed within a pocket or storage compartment on the back of a vehicle seat so that the device is in close proximity to the charger 24 or 26 to allow the device to be charged. Additional device chargers 50, 52 and 54 are positioned in locations within the vehicle interior where an individual may place a portable electronic device.

A portable electronic device 55 is schematically shown in FIG. 1 having an associated transmitter 56. Another portable electronic device 57 has an associated transmitter 58. The transmitters 56 and 58 are each configured to transmit at least one wireless signal that can be detected by the detecting means of the system 20. The transmitters of the disclosed example embodiment may comprise ultra-wideband transceivers, such as the single chip transceivers available from DecaWave.

In some instances, the transmitter 56 is secured to an exterior of the portable device 55. In other situations, the transmitter 56 may be supported on or secured to a case that is then utilized for the portable device 55. Commercially available DecaWave tags are useful in such embodiments. In the example of FIG. 1, the transmitter 58 is embodied as part of the portable device 57. The detectors 32-36 may be configured to detect a variety of signals emitted from a transmitter that is part of a device or a transmitter that is added to the device for the purpose of facilitating locating the device. Those skilled in the art who have the benefit of this description will realize which configuration of a wireless signal transmitter will best meet their particular needs.

Figure 4:
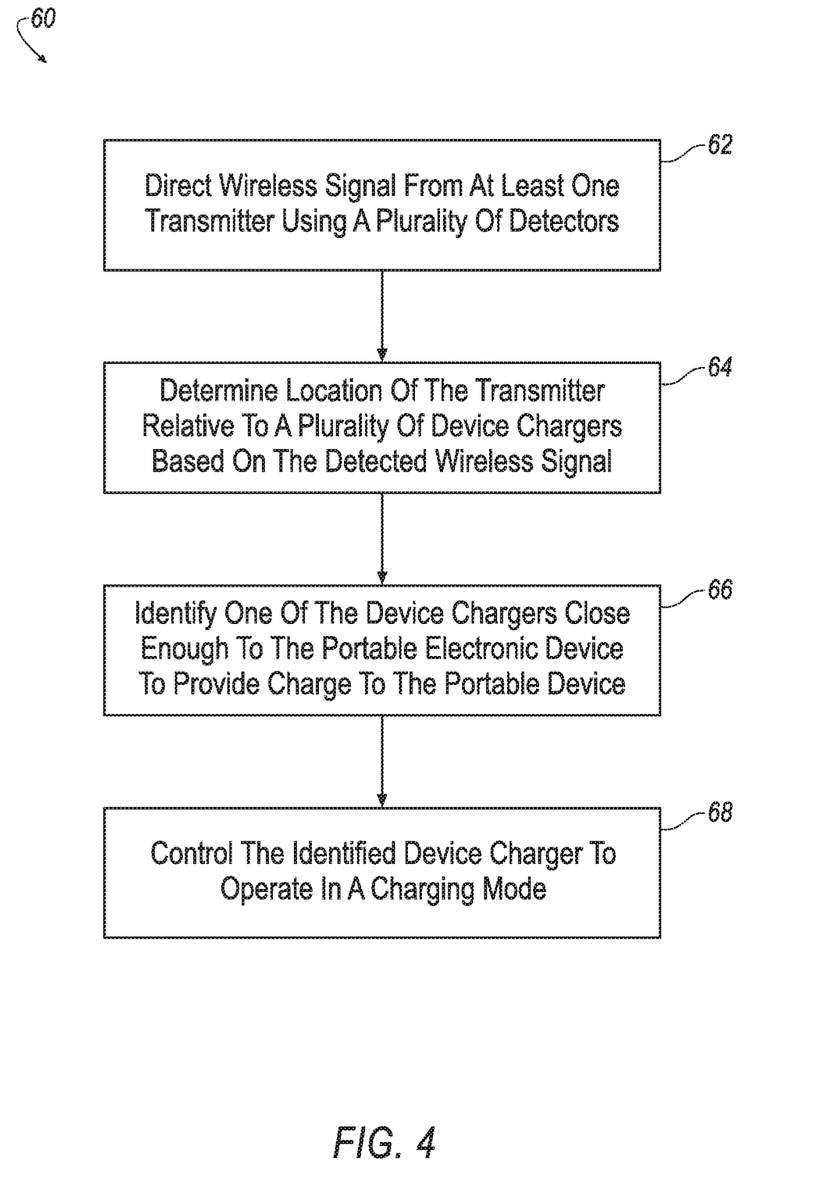
FIG. 4 is a flow chart diagram that summarizes an example sensing and control strategy.

FIG. 4 is a flowchart diagram 60 that summarizes an example control approach. At 62, a wireless signal is detected from at least one transmitter using a plurality of detectors. At 64, the location of the transmitter is determined relative to at least one of a plurality of device chargers based on the detected wireless signal. If the position of the portable electronic device is identified as being close enough to receive charge from one of the device chargers at 66 then the identified device charger is controlled at 68 to operate in a charging mode.

In one example, when more than one of the detectors 32-36 detects a signal from one of the transmitters 56 or 58, known triangulation techniques are utilized to determine the location of the associated portable electronic device within the vehicle interior relative to at least one of the device chargers 22-26. In one example embodiment, the location of the device may be specified within an accuracy of a few centimeters. The controller 40 utilizes information regarding device locations for purposes of controlling the device chargers 22-26.

Each of the device chargers has a charging mode in which the device charger provides power for charging the power source of a portable electronic device. Each device charger also has a power-saving, inactive mode during which the device charger does not utilize power and does not provide any charging to another device. One feature of the controller 40 is that it controls the device chargers to minimize power consumption by the system 20 by only placing device chargers into the charging mode when a portable electronic device is situated relative to such a device charger in a location where charging is possible.

Although a single transmitter is illustrated with each of the portable devices 55 and 57 in FIG. 1, it is possible to associate more than one transmitter with a particular portable electronic device. If more than one transmitter is provided and the relative location of each transmitter on the device is known, the controller 40 may utilize information from such transmitters to determine an orientation of the portable electronic device relative to at least one of the device chargers within the vehicle. Determining the orientation of the device may facilitate better placement of the device relative to the device charger to achieve a more effective charge.

Device orientation information may also be obtained by the controller 40 from an inertial measurement unit associated with a device. Alternatively, the controller 40 may obtain orientation information from the device itself in situations in which the device has orientation determination capabilities and can communicate orientation information to another device. Communications between the controller 40 and an inertial measurement unit or the portable electronic device itself may be realized through direct wireless communication or through a transmission from the unit or device that is received by one of the detectors 32-26.

The controller 40 in some embodiments continuously or periodically monitors the position of a portable electronic device relative to a selected one of the device chargers. During vehicle travel, for example, the device may move into a different position relative to the charger compared to the position in which it was placed by an individual. This is especially likely when the road conditions are rough. The example controller 40 notifies an individual regarding such changes so that a more consistent or continuous charge of the device is possible over time. This feature is useful regardless of how visible or apparent the locations of the charging devices are within the vehicle.

One aspect of the disclosed example embodiment is that it allows for device chargers to be situated within a vehicle interior without disrupting the design or appearance of that interior. In such instances, it may be not readily apparent to an individual where a device charger is situated for purposes of placing a portable electronic device in a good or ideal position to be charged. The controller 40 utilizes information from the detectors 32-36 for purposes of determining a position of a portable electronic device within the vehicle interior and controls the user interface 46 to provide an indication to an individual regarding placement of the electronic device to guide an individual to place the device in a position where it may be charged.

Another feature of the example controller 40 is that it is configured to determine a level of charge of a portable electronic device and to control a device charger accordingly. For example, the controller 40 may receive information regarding a level of charge of the portable electronic device, the amount of charge being provided to the portable electronic device, or both. Such information may be provided by the device charger or the electronic device. If the device is fully charged, the controller 40 in this example switches the selected device charger from the charging mode to the power-saving, inactive mode.

The controller 40 in this example also has the capability of detecting when the rate or level of charge being provided to the portable device is less than that which is possible from a particular device charger given the current level of charge of the portable electronic device. If the portable electronic device is not properly situated relative to the charger, the ability to provide charge to that device may be compromised. The controller 40 utilizes location information regarding the position of the portable device and information regarding a level of charge being delivered to that device to determine whether an adjustment of the device position would be useful. In one example, the controller 40 provides an indication through the user interface 46 to an individual so that the individual may adjust the placement or position of the portable electronic device relative to the appropriate device charger to achieve a more effective delivery of charge to the power source of that device.

One example use of information regarding the charge level of the portable device is to provide an alert to a driver regarding the charge level. In one embodiment, the controller 40 communicates with a navigation system onboard the vehicle to determine an approximate amount of time that is left to charge the portable electronic device. Given the current rate of charge delivery and the remaining travel time to an identified target destination, the controller 40 can determine whether the device will be fully charged by the end of the trip. If the current rate of charge delivery is not sufficient for a complete charge within the remaining travel time, the controller 40 provides a prompt to the driver to adjust the position of the device so that a better charge rate may be achieved.

In some embodiments, the controller 40 provides recommendations to place a device in position to be charged based on the current charge level of the device. The controller 40 in one such embodiment monitors the charge level of a portable electronic device by communicating with that device directly (or through any of the detectors 32, 34, 36). If the controller 40 determines that the charge level of a portable electronic device is below a threshold, such as 20% charge remaining, the controller 40 provides an indication through the user interface 46 that the device should be charged. Based on the current location of the device, the controller may recommend a particular movement of the device toward a selected device charger.

One embodiment includes taking into account information regarding an individual's schedule as may be available from a calendar on the portable electronic device or another device for purposes of determining whether to recommend a charge. For example, if a conference call is scheduled within an expected duration of a trip and the charge level of a mobile phone is low enough that it may present difficulty in completing the call, the controller 40 provides a recommendation to charge the phone to increase the likelihood that there will be sufficient charge for the call.

In some embodiments, the controller 40 communicates with any portable electronic devices in the vehicle to determine their respective charge levels. The controller 40 then provides an indication to the driver regarding any devices that are not fully charged and requests driver input regarding whether it would be desirable to charge any of those. If so, the controller 40 provides guidance as described above to facilitate placing any such device into a position where it may be charged. Once such a device is determined to be close enough to a device charger, that charger is activated or operated in the charging mode.

The disclosed example embodiment facilitates incorporating wireless charging technology into a vehicle while managing power consumption associated with such a system. Additionally, the disclosed example embodiment facilitates guiding a user to proper placement of a device for charging purposes to compensate for any movement of the device during vehicle travel and without having to make the device charger visually apparent to a driver or passenger. This latter aspect allows for maintaining desired vehicle interior aesthetics.

The preceding description is illustrative rather than limiting in nature. Variations and modifications to the disclosed examples may become apparent to those skilled in the art that do not necessarily depart from the essence of the contribution to the art provided by the disclosed embodiments. The scope of legal protection can only be determined by studying the following claims.

We claim:

1. A system for charging a portable electronic device within a vehicle, comprising:
    a plurality of device chargers configured to charge a power source of a portable electronic device in a charging mode, the plurality of device chargers having respective predetermined locations;
    at least one transmitter configured to be associated with a portable electronic device, the transmitter emitting at least one type of wireless signal;
    a plurality of detectors that are configured to be supported on a vehicle, the plurality of detectors detecting the wireless signal from the at least one transmitter; and
    a controller that utilizes information from the detectors regarding a detected wireless signal from the at least one transmitter and determines a location of the at least one transmitter relative to the plurality of device chargers, the controller controls at least a selected one of the device chargers to operate in the charging mode based on a proximity between the determined location of the at least one transmitter and the predetermined location of the selected one of the device chargers, wherein the controller is configured to:
    communicate with a vehicle navigation system;
    determine an approximate remaining time of a current trip;
    determine a rate at which a portable electronic device is being charged;
    determine whether the rate is sufficient to provide a complete charge to the portable electronic device during the remaining time; and
    provide an indication to change a position of the portable electronic device relative to the selected device charger if changing the position will increase a likelihood of achieving a complete charge within the remaining time.

2. The system of claim 1, comprising a user interface that provides information regarding a position of the at least one transmitter relative to at least the selected one of the device chargers.

3. The system of claim 2, wherein the user interface provides an indication of a movement of a portable electronic device associated with the at least one transmitter that will place the portable electronic device into a position where the selected one of the device chargers can charge the power source of the portable electronic device.

4. The system of claim 3, wherein
the controller determines an orientation of the portable electronic device relative to the selected one of the device chargers; and
the user interface provides an indication of an adjustment of the orientation of the portable electronic device to facilitate charging the power source of the portable electronic device.

5. The system of claim 1, wherein the controller is configured to
determine a rate of charging provided by the selected one of the device chargers; and
determine an adjustment of a position of the portable electronic device associated with the at least one transmitter if the rate of charging is below a predetermined level.

6. The system of claim 1, wherein the controller is configured to
determine a charge level of the power source of the portable electronic device associated with the at least one transmitter; and
selectively control whether the selected one of the device chargers operates in the charging mode based on the determined charge level.

7. The system of claim 1, wherein the controller is configured to
determine a charge level of at least one portable electronic device; and
provide a recommendation to place the portable electronic device close to a selected device charger if the determined charge level is below a threshold.

8. The system of claim 1, wherein the controller is configured to
determine that a particular portable electronic device is likely to be used for a task during a trip based on schedule information obtained by the controller;
determine a charge level of the particular portable electronic device; and
provide an indication to move the particular portable electronic device into a position near the selected charging device if the determined charge level appears inadequate to facilitate performing the task.

9. The system of claim 1, wherein the at least one transmitter is
configured to be secured to an exterior of the portable electronic device,
configured to be secured to a case that is configured to receive the portable electronic device, or
included within the portable electronic device.

10. The system of claim 1, wherein
each device charger has a power-saving, inactive mode during which the device charger does not operate to provide charge to a portable electronic device; and
each device charger remains in the power-saving, inactive mode unless the controller causes the device charger to operate in the charging mode.

11. A vehicle comprising the system of claim 1, wherein
the detectors are supported on the vehicle to detect the wireless signal at least when the at least one transmitter is within an interior of the vehicle; and
the device chargers are situated in predetermined locations in the vehicle interior.

12. A method of charging a portable electronic device, the method comprising:
detecting a wireless signal from at least one transmitter using a plurality of detectors that are configured to be supported on a vehicle, the at least one transmitter being configured to be associated with a portable electronic device;
determining a location of the at least one transmitter relative to a plurality of device chargers based on the detected wireless signal, the plurality of device chargers being configured to charge a power source of a portable electronic device in a charging mode, the plurality of device chargers having respective predetermined locations;
controlling at least a selected one of the device chargers to operate in the charging mode based on a proximity between the determined location of the at least one transmitter and the predetermined location of the selected one of the device chargers;
determining an approximate remaining time of a current trip based on information from a vehicle navigation system;
determining a rate at which a portable electronic device is being charged;
determining whether the rate is sufficient to provide a complete charge to the portable electronic device during the remaining time; and
providing an indication to change a position of the portable electronic device relative to the selected device charger if changing the position will increase a likelihood of achieving a complete charge within the remaining time.

13. The method of claim 12, comprising providing information through a user interface regarding a position of the at least one transmitter relative to at least the selected one of the device chargers.

14. The method of claim 13, comprising using the user interface to provide an indication of a movement of a portable electronic device associated with the at least one transmitter that will place the portable electronic device into a position where the selected one of the device chargers can charge the power source of the portable electronic device.

15. The method of claim 12, wherein the at least one transmitter comprises a plurality of transmitters associated with one portable electronic device; and
the method comprises
determining an orientation of the portable electronic device relative to the selected one of the device chargers based on signals from the plurality of transmitters; and
using the user interface to provide an indication of an adjustment of the orientation of the portable electronic device to facilitate charging the power source of the portable electronic device.

16. The method of claim 12, comprising
determining a rate of charging provided by the selected one of the device chargers; and
determining an adjustment of a position of the portable electronic device associated with the at least one transmitter if the rate of charging is below a predetermined level.

17. The method of claim 12, comprising
determining a charge level of the power source of the portable electronic device associated with the at least one transmitter; and
selectively controlling whether the selected one of the device chargers operates in the charging mode based on the determined charge level.

18. The method of claim 12, comprising
determining a charge level of at least one portable electronic device; and
providing a recommendation to place the portable electronic device close to a selected device charger if the determined charge level is below a threshold.

19. The method of claim 12, comprising
determining that a particular portable electronic device is likely to be used for a task during a trip based on schedule information obtained by the controller;
determining a charge level of the particular portable electronic device; and
providing an indication to move the particular portable electronic device into a position near the selected charging device if the determined charge level appears inadequate to facilitate performing the task.

20. The method of claim 12, wherein the at least one transmitter is
configured to be secured to an exterior of the portable electronic device,
configured to be secured to a case that is configured to receive the portable electronic device, or
included within the portable electronic device.

21. The method of claim 12, comprising
maintaining each device charger in a power-saving, inactive mode during which the device charger does not operate to provide charge to a portable electronic device when there is no portable electronic device close enough to the device charger to be charged by the device charger.

22. A vehicle comprising a system configured to perform the method of claim 12, wherein
the detectors are supported on the vehicle to detect the wireless signal at least when the at least one transmitter is within an interior of the vehicle; and
the device chargers are situated in predetermined locations in the vehicle interior.

23. A system for charging a portable electronic device within a vehicle, comprising:
a plurality of device chargers configured to charge a power source of a portable electronic device in a charging mode, the plurality of device chargers having respective predetermined locations;
at least one transmitter configured to be associated with a portable electronic device, the transmitter emitting at least one type of wireless signal;
a plurality of detectors that are configured to be supported on a vehicle, the plurality of detectors detecting the wireless signal from the at least one transmitter; and
a controller that utilizes information from the detectors regarding a detected wireless signal from the at least one transmitter and determines a location of the at least one transmitter relative to the plurality of device chargers, the controller controls at least a selected one of the device chargers to operate in the charging mode based on a proximity between the determined location of the at least one transmitter and the predetermined location of the selected one of the device chargers;
wherein the controller is configured to
determine that a particular portable electronic device is likely to be used for a task during a trip based on schedule information obtained by the controller;
determine a charge level of the particular portable electronic device; and
provide an indication to move the particular portable electronic device into a position near the selected charging device if the determined charge level appears inadequate to facilitate performing the task.

* * * * *